United States Patent
Yong et al.

(10) Patent No.: US 11,063,341 B2
(45) Date of Patent: Jul. 13, 2021

(54) ANTENNA ASSEMBLY AND MOBILE TERMINAL USING SAME

(71) Applicant: AAC Technologies Pte. Ltd., Singapore (SG)

(72) Inventors: Zhengdong Yong, Shenzhen (CN); Zhimin Zhu, Shenzhen (CN); Daniel Bengt Jansson, Shenzhen (CN); Xiaoyue Xia, Shenzhen (CN); Chao Wang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 47 days.

(21) Appl. No.: 16/447,900

(22) Filed: Jun. 20, 2019

(65) Prior Publication Data

US 2019/0393587 A1    Dec. 26, 2019

(30) Foreign Application Priority Data

Jun. 22, 2018 (CN) .......................... 201810651561.6

(51) Int. Cl.
| H01Q 1/42 | (2006.01) |
| H01Q 1/24 | (2006.01) |
| H01Q 3/38 | (2006.01) |
| H01Q 13/10 | (2006.01) |
| H01Q 21/06 | (2006.01) |
| H01Q 21/22 | (2006.01) |
| H04M 1/02 | (2006.01) |

(52) U.S. Cl.
CPC ............... *H01Q 1/243* (2013.01); *H01Q 3/38* (2013.01); *H01Q 13/10* (2013.01); *H01Q 21/064* (2013.01); *H01Q 21/22* (2013.01); *H04M 1/0283* (2013.01); *H01Q 1/42* (2013.01)

(58) Field of Classification Search
CPC ........ H01G 1/243; H01G 3/38; H01G 21/064; H01G 21/22; H01G 1/42
See application file for complete search history.

(56) References Cited

U.S. PATENT DOCUMENTS

| 4,410,890 A * | 10/1983 | Davis ..................... H01Q 13/10 |
| | | 342/419 |
| 2008/0191953 A1 * | 8/2008 | Bruno ................... H01Q 21/064 |
| | | 343/769 |
| 2017/0302306 A1 * | 10/2017 | Ouyang ............... H04B 1/1081 |

* cited by examiner

*Primary Examiner* — Graham P Smith
(74) *Attorney, Agent, or Firm* — IPro, PLLC; Na Xu

(57) ABSTRACT

The present disclosure provides an antenna assembly. The antenna assembly comprises a rear cover with a closed metal frame and a circuit board arranged in the rear cover. A plurality of antenna units are arranged, each of which comprises an antenna slot and a first metal portion and a second metal portion which separates the metal frame through the antenna slot, a plurality of phase converters are arranged on the circuit board. Compared with the related art, the antenna assembly provided by the invention has the beneficial effect of good aesthetics, fast heat diffusion, good radiation performance and good antenna gain and space coverage.

10 Claims, 5 Drawing Sheets

ANTENNA ASSEMBLY AND MOBILE TERMINAL USING SAME

FIELD OF THE DISCLOSURE

The present disclosure relates to antenna technology, and more particularly to an antenna assembly and mobile terminal using the same.

DESCRIPTION OF RELATED ART

In wireless communication equipment, there is always a device that radiates electromagnetic energy to space and receives electromagnetic energy from space, which is the antenna.

The role of an antenna is to transmit digital or analog signals modulated to the RF frequency to a space wireless channel, or to receive digital or analog signals modulated on the RF frequency from a space wireless channel.

5G as the focus of research and development in the global industry, the development of 5G technology to develop 5G standards has become the industry consensus. At the 22nd meeting of ITU-RWP5D, held in June 2015, ITU of the International Telecommunication Union identified three main scenarios for 5G: Enhanced mobile broadband, large-scale machine communications, and highly reliable low-latency communications. The 3 scenarios correspond to different key metrics, with the user peak speed of 20 Gbps and the lowest user experience rate of 100 Mbps under the enhanced mobile bandwidth scenario.

The unique high frequency carrier and large bandwidth characteristics of millimeter wave are the main means to realize 5G ultra-high data transmission rate. The abundant bandwidth resources in millimeter wave band provide a guarantee for high speed transmission rate, but because of the violent space loss of electromagnetic wave in this frequency band, the wireless communication system using millimeter wave frequency band needs to adopt the architecture of phased array.

In the related arts, the phase of each array is distributed according to a certain law through the phase shifting device, thus forming a high gain beam, and the beam is scanned within a certain space range by the change of phase shift.

Metal frame architecture is the mainstream scheme in the design of mobile phone structure, which can provide better protection, aesthetics, heat diffusion and user experience, but because of the shielding effect of metal on electromagnetic wave, it will seriously affect the radiation performance of upper and lower antennas and reduce the gain of antennas.

Therefore, it is necessary to provide a new type of antenna assembly to solve the above problems.

BRIEF DESCRIPTION OF THE DRAWINGS

Many aspects of the exemplary embodiments can be better understood with reference to the following drawings. The assembly in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be hereinafter be described in detail below with reference to the attached drawings and embodiments thereof.

Figure 1:
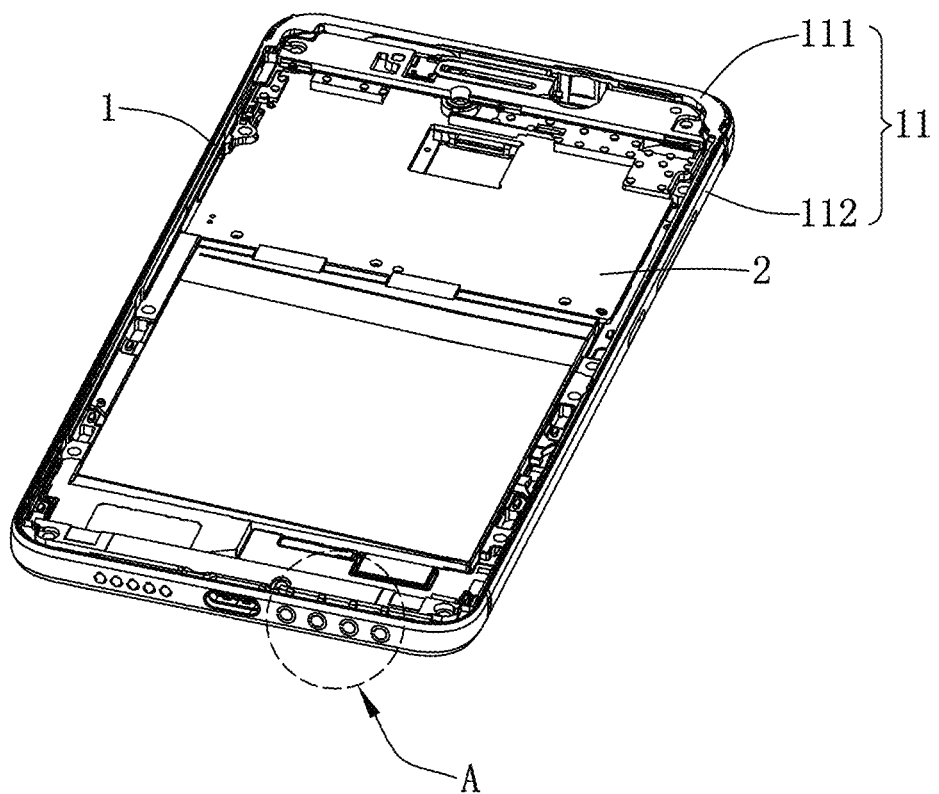
FIG. 1 is the structure diagram of the mobile terminal of the present invention.
Figure 2:
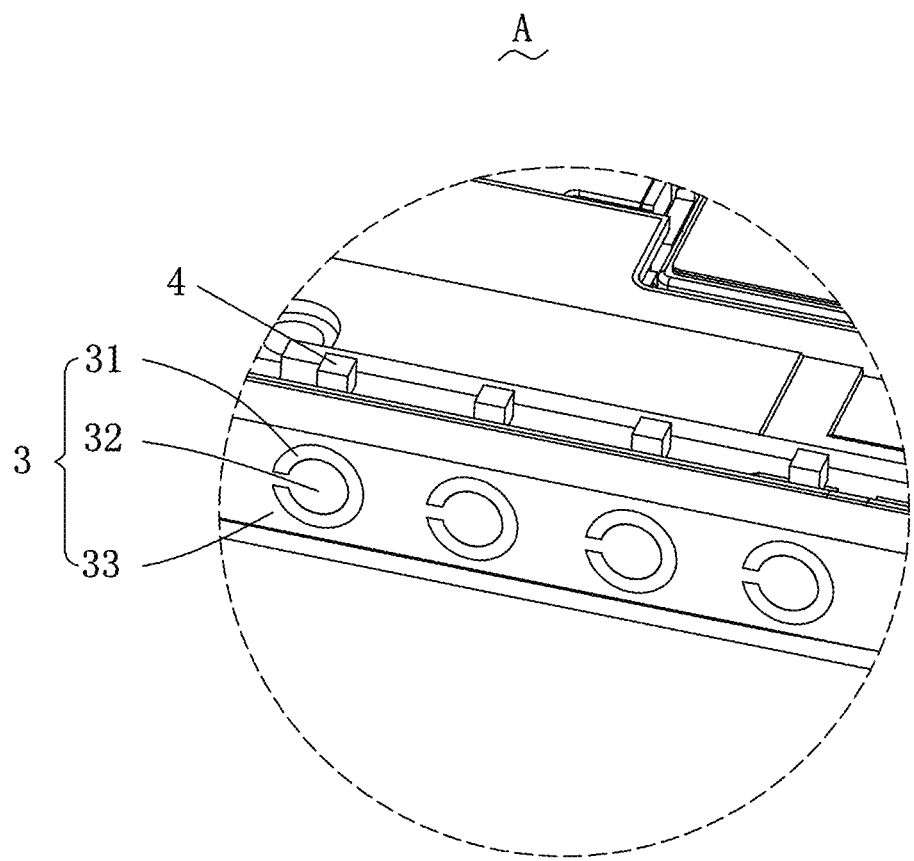
FIG. 2 is A magnified diagram of part A of FIG. 1.

Please also refer to FIG. 1 and FIG. 2, the embodiment of the present invention provides an antenna assembly 100, applied to mobile terminals, the mobile terminals may be a mobile phone, a laptop, a tablet, a POS machines, or the like.

The antenna Assembly 100 comprises a rear cover 1 having a closed metal fame 11, a circuit board 2 disposed in the rear cover 1, and a plurality of antenna units 3 arranged in an array in a circumferential directional array along the metal frame 11.

Each antenna unit 3 comprises an antenna slot 31 arranged on the metal frame 11, a first metal portion 32 and a second metal portion 33. The antenna slot 31 separates the metal frame 11 into the first metal portion 32 and the second metal portion 33. Since the length of the mobile terminal such as mobile phone is large, even if the metal frame 11 is opened with the antenna slot 31, which can also meet the strength requirements of the rear cover 1, thereby in order to ensure the performance of anti-fall, and the antenna slot 31 is disposed on the metal frame 11 to increase the aesthetics of the mobile terminal.

The metal frame 11 comprises two long side-frames 111 opposite to each other and two short side-frames 112 opposite to each other. The antenna unit 3 is disposed on the short side-frame 112. Because of the design of the mobile terminal such as mobile phones, the long side-frame 111 is used to provide a place for handshake. Therefore the antenna unit 3 is disposed on the short side-frame 112, and the hand will not block the antenna unit 3, which is more conducive to the antenna unit 3 signal radiation and reception, it does not affect the appearance of the mobile terminal.

The antenna unit 3 also includes a polycarbonate material filled in the antenna slot 31, which facilitates the signal from the antenna slot 31 through. In addition, by the structure filling the polycarbonate material in the antenna slot 31 can also effectively prevent the external environment of water, dust and so on through the antenna slot 31 into the mobile terminal inside, to ensure that the metal frame 11 appearance smooth and tidy. In the preferred embodiment of the present invention, the antenna slot 31 is an open ring shape, the outer diameter of the ring-shaped antenna slot 31 is 3 mm, and the inner diameter is 2 mm.

Of course, the shape of the antenna slot 31 is not limited to the opening ring shape, such as a closed ring shape, an L-shaped, a V-shaped, a long strip or a cross shape is feasible, the scope of protection of the present invention is not limited to thereto, the equivalent of other shapes of antenna slot 31 also should belong to the scope of protection of the present invention.

In the concrete embodiment provided by the present invention, the number of antenna unit 3 is four, and the number of antenna unit 3 can be set according to the actual needs of a reasonable quantity, but this should within the protection scope of the present invention.

Further, the antenna unit 3 is made by nano-molding process on metal frame 11, which can effectively simplify and shorten the manufacturing process of the antenna unit 3, reduce the unnecessary surface treatment process of metal frame 11, and at the same time, minimize the impact on the environment when manufacturing the antenna unit 3.

Figure 3:
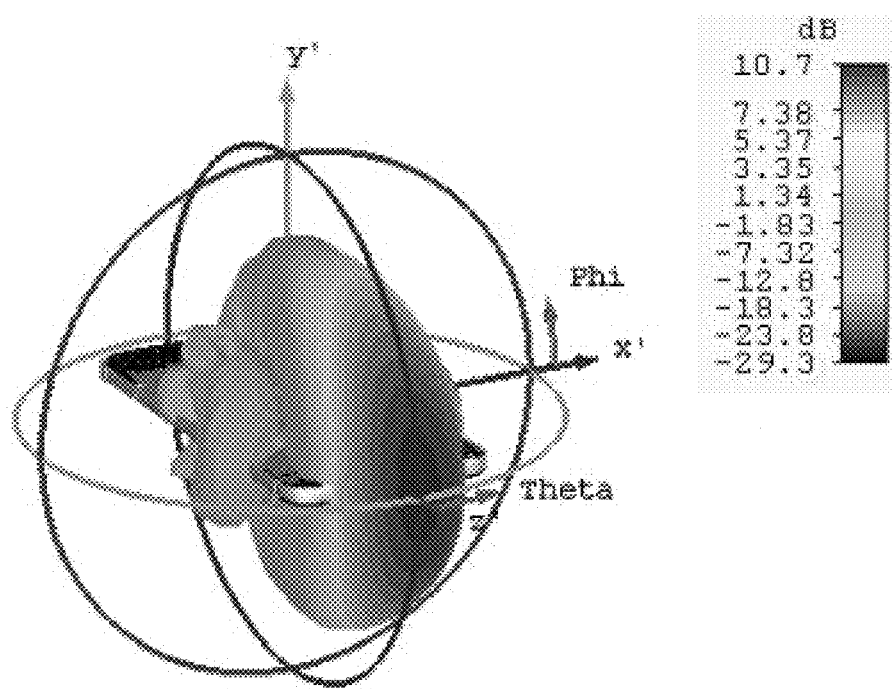
FIG. 3 is a schematic diagram of the antenna assembly of the present invention under the condition of 0 phase shift.

Further, the antenna assembly 100 also includes a plurality of phase converters 4 disposed on the circuit board 2. The Phase converter 4 is a 5 bit phase converter with an accuracy of 11.25°. The phase of the signal radiated by the antenna unit 3 is adjusted by setting the phase converter 4, so that the phases of the plurality of antenna elements 3 are distributed according to a certain rule, thereby forming a high-gain beam, and the beam is scanned within a certain spatial range by the change of the phase shift, thus increasing the space coverage of antenna assembly 100. Scanning, thereby increasing the spatial coverage of the antenna assembly 100. Please refer to FIG. 3 for details, when each antenna unit 3 is fed in the same phase, the beam is facing the antenna unit 3 of the metal frame 11 outward direction.

Figure 4:
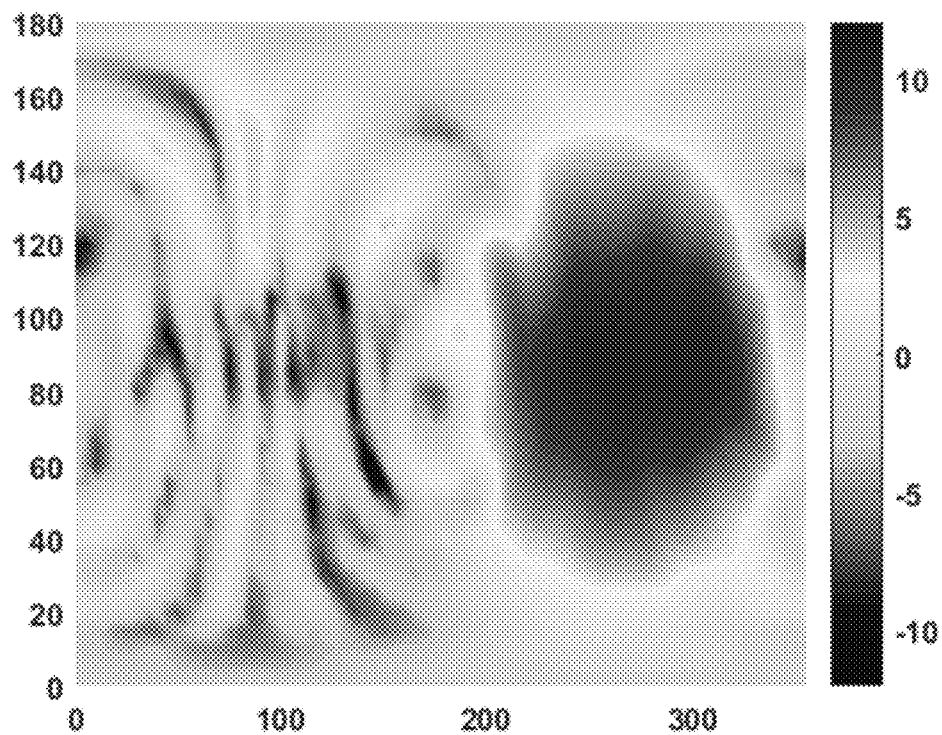
FIG. 4 is the total scanning mode diagram of the antenna assembly of the present invention.
Figure 5:
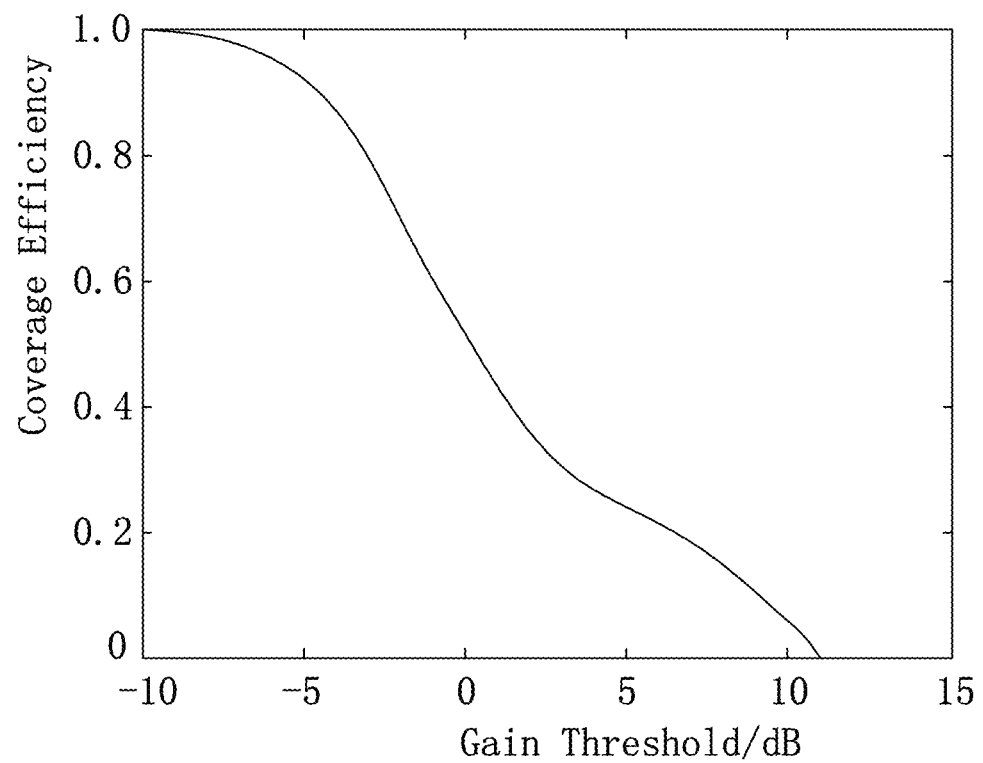
FIG. 5 is an overlay efficiency diagram of the antenna assembly applied to the present invention.

Refer to FIG. 4 and FIG. 5, as can be seen from FIGS. 4 and 5, where the space coverage of the antenna assembly 100 is extremely large.

The antenna assembly 100 also includes a dogan coaxial probe (not shown in the figure), each coaxial probe electrically connected with a phase shift device 4 and an antenna unit 3, the coaxial probe comprises an inner conductor in the same axis and an outer conductor of the same axis arranged in the inner conductor of the same axis, and the inner conductor connected with the same axis of the first metal portion 32, and the outer conductor of the same axis connected with the second metal portion 33.

Using this coaxial feed method, each antenna unit 3 transmission signal will not produce radiation loss, not only will not be disturbed by external signals, and the working frequency band is wider, can be used in millimeter wave band, very suitable for 5G ultra-high data transmission rate.

The present invention also provides a mobile terminal (not shown in the figure), which comprises the antenna assembly described above, the antenna slot of the antenna assembly is exposed to the outside of the mobile terminal, and usually the rear cover and circuit board of the mobile terminal are the rear cover and circuit board of the antenna assembly. Compared with the relevant art, the antenna assembly and mobile terminals provided by the present invention by setting up multiple antenna units on the closed metal frame, using the antenna slot to separate the metal frame from the first metal portion and the second metal portion, and through the phase converter shift control of the phase converters of each antenna unit, to achieve a certain spatial range of beam scanning, Thus, the antenna assembly has the advantages of good aesthetics, fast heat diffusion, good radiation performance and good antenna gain and space coverage.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An antenna assembly, comprising:
   a rear cover with a closed metal frame, and
   a plurality of antenna units arranged in an array in a circumferential directional array along the metal frame, wherein each of antenna unit comprises an antenna slot arranged on a metal frame and a first metal portion and a second metal portion formed by separating the metal frame through the antenna slot;
   wherein the antenna slot is open ring shape, the outer diameter of the antenna slot is 3 mm, and the inner diameter is 2 mm.

2. The antenna assembly as described in claim 1, wherein the antenna Assembly also includes a circuit board arranged in the rear cover, which is provided with a plurality of phase converters, each of which is electrically connected to one antenna unit.

3. The antenna assembly as described in claim 1, wherein the antenna unit also comprises a polycarbonate material filled in the antenna slot of the antenna.

4. The antenna assembly described in claim 1, wherein the antenna unit is made on a metal frame through a nano-forming process.

5. The antenna assembly described in claim 3, wherein the antenna unit is made on a metal frame through a nano-forming process.

6. The antenna assembly as described in claim 3, wherein the number of antenna units is four.

7. The antenna assembly as described in claim 4, wherein the metal frame comprises two short side frames opposite to each other and two long side frames opposite to each other, and the antenna unit is arranged on a short side frame.

8. The antenna assembly as described in claim 5, wherein the metal frame comprises two short side frames opposite to each other and two long side frames opposite to each other, and the antenna unit is arranged on a short side frame.

9. The antenna assembly as described in claim 2, wherein the phase converter is a 5 bit phase shifting device with an accuracy of 11.25°.

10. The antenna assembly as described in claim 1, wherein the antenna slot is any of the closed-mouth ring, L-shaped, V-shaped, long strip or 10-shaped glyphs.

* * * * *